Patented Aug. 12, 1924.

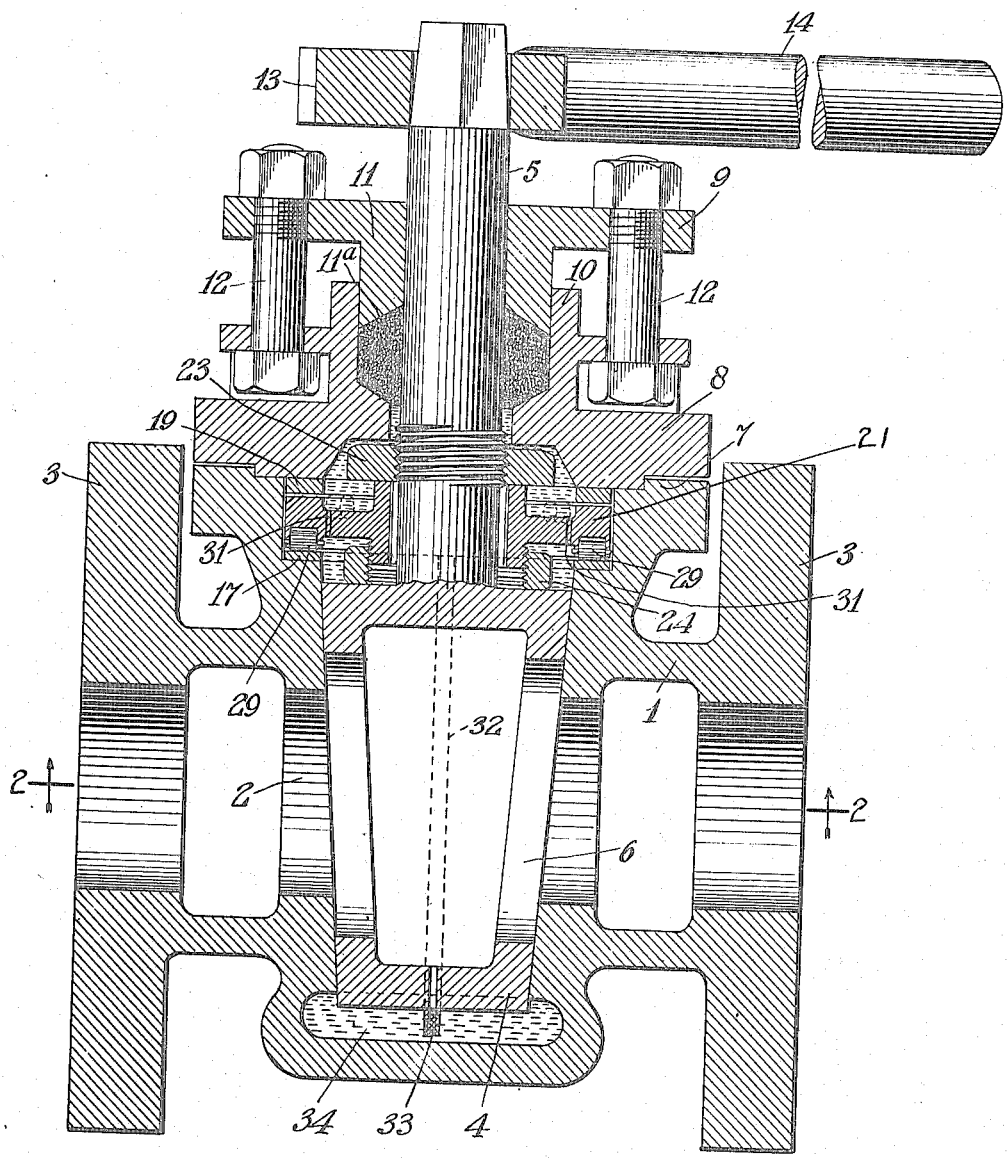

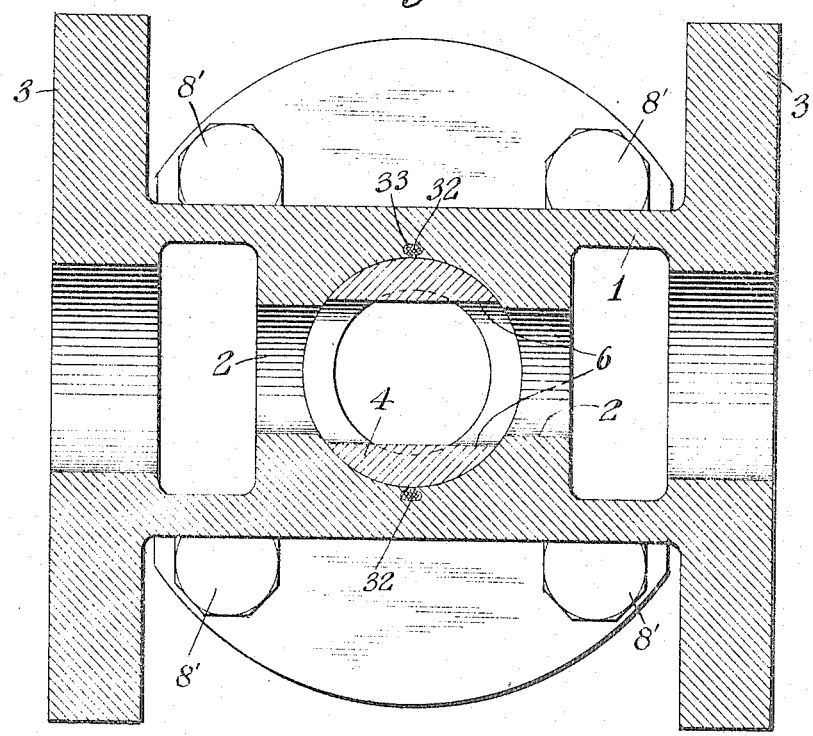
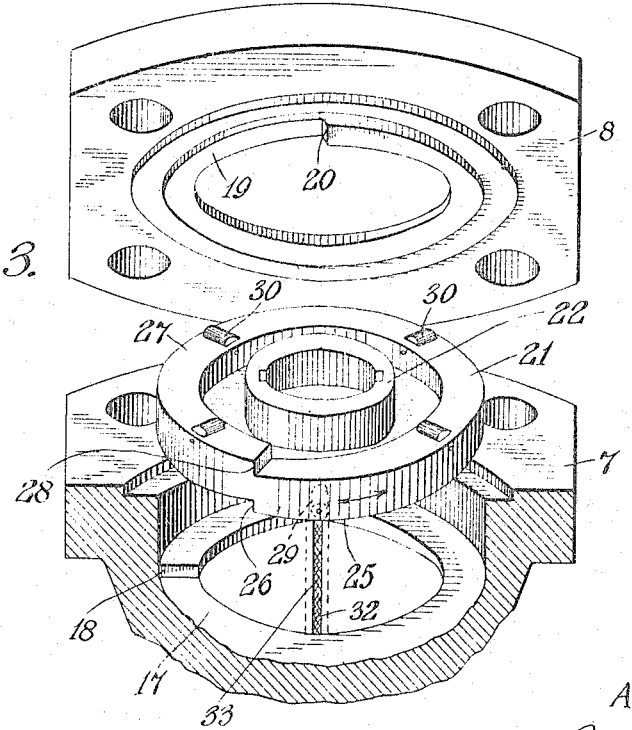

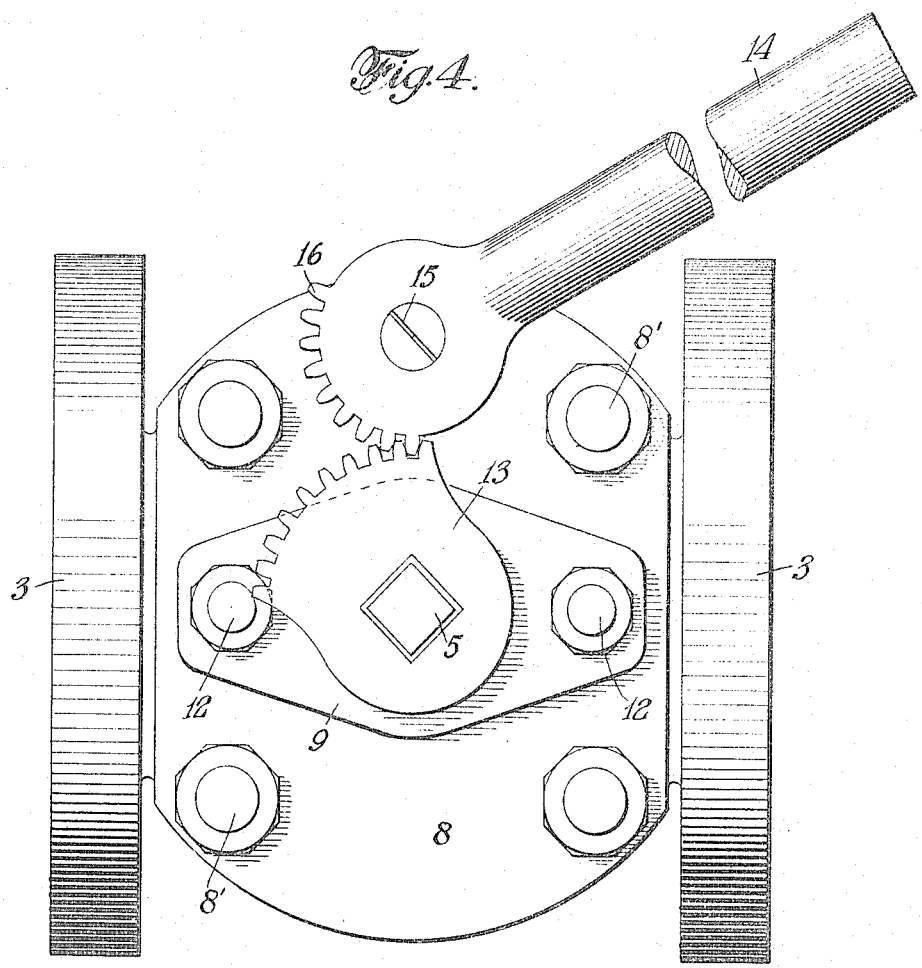

1,504,219

UNITED STATES PATENT OFFICE.

ALBERT A. CRYER, OF NEW YORK, N. Y., ASSIGNOR TO D. G. C. TRAP & VALVE CO., INC., OF NEW YORK, N. Y., A CORPORATION OF NEW YORK.

PLUG COCK.

Application filed July 21, 1922. Serial No. 576,417.

*To all whom it may concern:*

Be it known that I, ALBERT A. CRYER, a citizen of the United States, residing at 74th Street and Broadway, New York city, in the county and State of New York, have invented new and useful Improvements in Plug Cocks, of which the following is a specification.

This invention relates to valves and particularly to valves of the stop cock type for controlling the flow of fluids. It is adapted for use with a wide variety of fluids, such as steam, tar, oils, water, acids, etc., and may be used in high or low pressure systems.

The object of this invention generally is a valve of improved construction whereby a tight closure may be effected and maintained and the operation thereof may be readily and easily effected with a minimum of effort.

A further object is to avoid or minimize the cutting and scoring of the valve operating parts and to prevent the abrading action thereon by foreign material contained in the flowing fluid.

A still further object is to provide certain improved novel features in construction whereby adjustments may be readily made to compensate for wear of the valve operating parts. These ends and objects are attained in a valve of simple construction and operation which may be economically manufactured and assembled.

For a better understanding of the objects of this invention as above-indicated and other novel features which will hereinafter appear, reference may be had to the accompanying drawings wherein:—

Fig. 1 is a longitudinal, sectional view through the improved cock and valve chamber;

Fig. 2 is a sectional view along the line 2—2 of Fig. 1;

Fig. 3 is an exploded view, more or less diagrammatically illustrating certain operative parts of the valve; and Fig. 4 is a plan view of the valve.

Referring to the drawings where like numerals designate similar parts throughout, a valve casing is illustrated which embodies a main base member 1 having a passage 2 therethrough for the passage of the fluid. The main member 1 has a pair of coupling flanges 3 which afford one of the usual ways for inserting the valve in the fluid circuit to be controlled. Substantially midway the coupling flanges 3, the base member 1 is provided with a conical valve seat for the reception of a similarly shaped conical key 4, the latter being carried by or operatively attached to an operating stem 5. In the particular instance illustrated the stem 5 and the key 4 are integral. The valve key 4 is made hollow and has a transverse passage therethrough for registration with the passage 2 in the open position of the valve illustrated in Fig. 1. This transverse passage through the valve key is made larger than the passage 2 through the main valve member in order that the edges 6 of the key may be shielded from the direct action of the fluid when the valve is in open position. The main valve member 1 is provided on its upper end with an annular seat 7 for the reception of a similarly shaped gland carrying member 8, the latter having surmounted thereabove a cooperating gland member 9 and the two gland members 8 and 9 having cooperating sleeves 10 and 11 for compressing the packing material 11ª about the stem 5. The bolts 12 engaging the plate 9 and a flange attached to the sleeve 10 effect the compression of the packing material. The main member 1 and the gland carrying member 8 are securely and separably fastened together by means of the bolts 8' passing through registering openings therein, there being four of such bolts in the particular valve illustrated.

The operating mechanism for the valve key 4 comprises a segmental gear 13 mounted on the upper end of the stem and a lever arm 14 which is mounted on a stud 15 carried by the member 8, said lever arm having a gear segment 16 which meshes with the half gear 13. The key 4 is rotated about its vertical axis through the medium of this arm 14 and the cooperating gears 13 and 16, thereby causing the opening or closing of the passage way 2 as is desired.

The main base member 1 is provided with an annular seat and on this seat there is disposed a bearing ring 17, the latter being in the form of a cam or inclined plane surface from its lowermost point to its highermost point, ending in the abrupt step or shoulder 18. The ring 17 as illustrated in Fig. 1 is an element separate from the base or chamber member 1. However, the ring may be included as an integral part of the base or chamber member. This alternative construction is illustrated in Fig. 3. The upper member 8 carries a corresponding annular shaped cam surface 19 having an abrupt step or shoulder 20. The shoulders 18 and 20 are disposed at 90° from each other and face each other as indicated in Fig. 3. The stem 5 carries a cam ring 21 which cooperates with the cam bearing surfaces 17 and 19 for lifting and lowering the key 4 during the opening and closing movements thereof. This central cam ring 21 embodies a central hub 22 which is splined to the stem 5 to provide for non-rotary but sliding movement with reference thereto. Just above the hub 22 the stem 5 carries an adjusting and tightening nut 23, the latter engaging suitable screw threads on the stem 5 and being capable of being screwed tightly down against the upper end of the hub 22. The lower end of the hub 22 is provided with external screw threads and a second adjusting nut 24 having internal screw threads is adapted to be adjustably mounted thereon to engage the upper end of the key 4 and in cooperation with the nut 23 to adjust the position of the key 4 with reference to the cam ring 21, whereby adjustment is provided to compensate for wear. The cam ring 21 is provided with an under cam surface 25 of reversed inclination with reference to the lower bearing ring 17 and having a shoulder 26 for engaging the shoulder 18 when the valve is in closed position. The cam ring 21 is also provided with an upper cam surface 27 which is of reversed inclination with reference to the bearing 19 and cooperates therewith for urging the conical valve in a downward direction tightly against its seat when the valve stem is turned in the proper direction for closing. This cam surface 27 has a shoulder 28 which is adapted to engage the shoulder 20 on the upper bearing ring 19 when the valve is in open position. The cam ring is also provided with a set of rolling surface bearings 29 on its underside and a set of rolling surface bearings 30 on its upper side for engaging the bearing rings 17 and 19 respectively and thereby providing a substantially frictionless engagement between the cooperating cam surfaces. These bearings may be of any suitable form or type to effect the desired frictionless rolling engagement between the cooperating cam surfaces and in this embodiment they are shown as of the roller type. They may be provided in the desired quantity to effect the desired results and, for convenience in illustration, I have illustrated only four of such bearings for each surface but it is understood that either a greater or lesser number may be provided, if desired. These roller bearings are illustrated as radially disposed, preferably slightly conical or tapering in contour with their smaller ends inwardly, and are carried in suitable sockets or recesses in the central cam ring 21, but they may be carried in any other suitable manner as, for example, by the bearing rings 17 and 19, if desired.

It is preferable, in certain cases, to properly lubricate the valve parts and for this purpose the chamber about the stem and above the cam ring 21 may be filled with the desired lubricant. This lubricant may be freely distributed downwardly from above the ring 21 through suitable openings 31 provided in the web thereof. I have also provided a pair of vertical grooves 32 in the walls of the conical valve seat of the main base member 1. In these grooves there are disposed suitable wiping or cleansing wicks 33 which engage the key and serve to keep the surface of the key 4 clean and clear of foreign material which would have a tendency to cut and grind the same. These wicks 33 also serve the purpose of distributing the lubricant from above the key 4 down the side walls thereof. They extend down into the grease chamber 34.

The operation of this valve is clear from the above disclosure. With the parts assembled as indicated in Figs. 1 and 3 the conical valve key 4 may be readily rotated about its vertical axis by simply moving the operating handle 14. In the closing movement the roller bearings 30 carried on the cam surface 27 run up the stationary inclined cam surface 19 and the roller bearings 29 run down the inclined bearing surface 17 thereby forcing the conical valve key 4 tightly against its conical seat so that when the shoulder 26 engages the shoulder 18 the valve is in a securely closed position. In the reverse or opening movement the reverse action takes place and the valve 4 is lifted from its seat, this lifting movement starting at the first rotary movement of the valve and continuing throughout the opening. When the shoulder 28 engages the shoulder 20 the valve is in open position with its edges 6 clear of the passage 2 and shielded by the adjacent chamber walls to prevent the abrading and cutting action of the foreign matter contained in the flowing fluid. The lifting action on the valve key greatly reduces its frictional resistances against movement from the closed position and makes it possible for the operator to open the valve without exerting any great effort. The multiplying gearing between the stem 5 and the operating handle 14 still further assists in the easy opening of the valve and is also very useful in enabling the operator to close the valve gradually, rather than with a forceful jerk, thus avoiding sudden increase of pressure, with its waterhammer effect. The annular cam surfaces and the associated rolling bearings are constructed and correlated together to effect a uniform and symmetrical seating and unseating of the key, so that uneven wearing of the key and the valve is avoided. For these reasons my improved plug cock can be safely used in situations where the plug cock type of valve is now usually disapproved by engineers. To disassemble the valve for the purpose of inspection or making adjustments it is only necessary to remove the four bolts 8' which secure the cooperating members 7 and 8 together whereupon the member 8 together with the gland member 9, 11 may be removed, the operating handle 14 and its segmental gear having been previously removed. The stem 5 together with the cam ring 21 and valve key 4 may then be removed and the desired adjustment of the key with reference to the cam ring 21 may be made for compensating for wear and securing a tight closure. If desired, the member 8 together with its gland and the key 4 may be removed together after the removal of the bolts 8'. Such adjustment for wear is made without disturbing the operative relation of the valve key and cooperating cams.

I claim:—

1. A valve for fluid control comprising a valve chamber having a conical seat therein, a valve key conforming to said seat and carried by an operating stem, a double cam also carried by said stem above the key and cooperating with a pair of opposed cam bearing surfaces and a plurality of bearings having rolling surfaces situated between each of the lower and upper surfaces of the cam and its corresponding cooperating cam surface.

2. A valve of the character set forth in claim 3 in which the said "bearings having rolling surfaces" are of the roller type.

3. A valve for fluid control comprising a valve having a conical seat therein, a valve key conforming to said seat and carried by an operating stem, a cam ring carried by said stem above the key and having parallel cam surfaces on its upper and lower faces, said cam surfaces cooperating respectively with two opposed stationary cam bearing surfaces, and a plurality of tapered roller bearings disposed between each pair of cooperating cam surfaces, said rollers being carried by the cam ring and being radially disposed thereon with their smaller ends extending inwardly.

4. A valve for fluid control comprising a valve chamber having a conical seat therein, a conical valve operatively associated with the valve stem and cooperating with said valve seat, a stationary cam surface disposed about the valve seat, a cam carried by the conical valve and cooperating with the aforesaid cam surface, and means whereby the cam is non-rotatable but longitudinally adjustable with reference to the conical valve member.

5. A valve for fluid control comprising a valve chamber having a conical seat therein, a conical valve operatively associated with said conical seat and having an operating stem extending upwardly therefrom, a cam ring having an upper and a lower cam surface, said ring being non-rotatably but longitudinally adjustable upon and with reference to said stem, upper and lower opposed cam surfaces cooperating with the upper and lower cam surfaces of said cam ring and a plurality of bearings having rolling surfaces disposed between the cooperating cam surfaces for the purpose set forth.

6. A valve for fluid control comprising a valve chamber having a conical seat therein, a conical valve key operatively associated with said conical seat and valve chamber, and having an operating stem extending upwardly therefrom, a cam ring having a hub portion splined to said stem just above the upper end of the conical valve, an adjustable screw-threaded nut engaging the upper edge of said cam ring and an adjustable screw-threaded nut cooperating with the under screw-threaded hub portion of the cam ring and adapted to engage the upper end of the conical valve to securely clamp the cam ring in position and a pair of stationary cooperating cam surfaces disposed respectively above and below the cam surfaces of the cam ring for the purpose set forth.

7. A valve for fluid control comprising a main base member having a passage therethrough and a conical valve seat therein, a conical valve member conforming to the valve seat and adapted to be rotated therein together with means for actuating the same, a gland carrying member adapted to be separably secured to the main base member, said members having a cam chamber disposed above the conical valve seat and a double cam carried by the conical valve and cooperating with reversed cam surfaces inside said cam chamber for imparting to said conical valve a lifting movement in opening and a downward movement in closing together with shoulders spaced 90° apart for arresting the movement of the valve after a 90° movement in either direction.

8. A valve for fluid control having a conical seat, a conical valve key conforming to the valve seat and adapted to be rotated therein, a cam carried by said key which in cooperation with stationary cam surfaces imparts a continuous lifting movement to the key during the opening operation and a continuous downward movement thereto in the closing movement.

9. In a valve of the character set forth in claim 8 the provision of actuating devices for the key comprising a power lever which is geared to the key stem for the purpose set forth.

10. A valve for fluid control comprising a valve chamber having a conical seat therein, a gland disposed above the conical seat, a lubricant and cam chamber disposed at a point intermediate the gland and conical seat, a conical valve member cooperating with said conical seat and said conical seat having a groove longitudinally arranged with reference to the conical valve with a wiping and cleansing wick disposed therein for the purpose set forth.

11. In a plug cock, lifting and lowering means for the key, including a member rotatable with the key and carrying two completely annular parallel cam surfaces, and fixed members carrying similar parallel cam surfaces cooperating one with each of the rotatable ones.

12. A valve for fluid control having a conical seat, a conical valve key conforming to the valve seat and adapted to be rotated therein, a cam carried by said key which, in cooperation with stationary cam surfaces disposed above and below said cam, is adapted to impart longitudinal movement to the valve key, said cam surfaces being constructed and correlated together to effect a uniform and symmetrical seating and unseating of the key, thereby preventing unequal wear on the key and the valve seat.

13. A valve for fluid control having a conical seat, a conical valve key conforming to the valve seat and adapted to be rotated therein, a cam carried by said key which, in cooperation with stationary cam surfaces, is adapted to impart longitudinal movements to said key in the closing and opening movements of the valve, a plurality of bearings having rolling surfaces associated with said cam surfaces, said bearings being uniformly and symmertically distributed about the valve key whereby a uniform and symmetrical seating and unseating of the key is obtained, thereby preventing unequal wear on the key and the valve seat.

In testimony whereof, I have signed my name to this specification.

ALBERT A. CRYER.